United States Patent [19]

Ruscitto

[11] 4,422,679

[45] Dec. 27, 1983

[54] TAMPER-PROOF FASTENER

[75] Inventor: Robert A. Ruscitto, Braintree, Mass.

[73] Assignee: Boston Edison Company, Boston, Mass.

[21] Appl. No.: 361,517

[22] Filed: Mar. 25, 1982

[51] Int. Cl.³ ............................................. B05D 33/34
[52] U.S. Cl. ................................................ 292/307 R
[58] Field of Search .............. 292/256.67, 251, 307 R, 292/327

[56] References Cited

U.S. PATENT DOCUMENTS

| | | | |
|---|---|---|---|
| 1,677,607 | 7/1928 | Wood . | |
| 2,084,963 | 6/1937 | Paige, Jr. . | |
| 2,226,396 | 12/1940 | Wackman | 292/256.67 |
| 2,772,109 | 11/1956 | Busch et al. | 292/307 R |
| 3,259,414 | 7/1966 | Rothert | 292/256.67 |
| 4,076,291 | 2/1978 | Pope et al. | 292/256.67 |
| 4,225,165 | 9/1980 | Kesselman . | |

*Primary Examiner*—Richard E. Moore
*Attorney, Agent, or Firm*—Kenway & Jenney

[57] ABSTRACT

Disclosed is a tamper-proof device for fastening a sealing collar. A hard metal tab engages a slot in the head of a bolt and prevents the bolt from turning, thereby preventing removal of the sealing collar. The device also provides means which prevent removal of the hard metal tab.

9 Claims, 5 Drawing Figures

TAMPER-PROOF FASTENER

BACKGROUND OF THE INVENTION

This invention relates to the prevention of tampering with electrical equipment. In particular, this invention provides a device for providing tamper-proof protection for the works of electrical appliances and household watt-hour meters.

While this tamper-proof fastener is useful with various types of electrical equipment, its major use is the protection from tampering of household electrical watt-hour meters. Household watt-hour meters have their works within a metal base enclosed by a glass cover. The glass cover, which prevents access to the works of the meter, is held in place by a sealing collar which clamps a flange on the glass cover to a similar flange on the metal base of the utility meter. Because of the rising cost of electricity, tampering with utility meters has become an increasingly prevalent problem. To combat this tampering, utilities have been seeking ways to make utility meters essentially tamper-proof. The most common method currently in use for preventing unauthorized access to utility meters is the key; that is, the sealing collar of the utility meter is fastened by a lock which requires a specific key. The problem with this method is that the keys may be lost or duplicated. If an unauthorized key is used to open the sealing collar, there is no evidence of tampering. Therefore, utilities are looking for another simple, economical method of preventing unauthorized access to utility meters. For economic reasons, any solution to this problem should use conventional sealing collars and require a minimum of reeducation of utility company personnel.

SUMMARY OF THE INVENTION

This invention comprises a substantially tamper-proof fastener which prohibits unauthorized access to the works of an applicance or utility meter. The fastener fastens a sealing collar which clamps a cover to the base of the appliance or utility meter. To gain access to the inner works, a bolt which clamps the ends of the sealing collar together must be loosened. In this invention, a hard metal tab passes through a slot in a wall near the bolt and engages an aligned slot in the head of the bolt. Removal of the hard metal tab is prevented by a bend near one end of the tab and a tamper-proof second bolt which passes through a hole through the tab. The bend in the tab and the tamper-proof second bolt prevent transit of the tab through the slot. Since the first bolt cannot turn while the tab engages the slot in its head, removal of the sealing collar is prevented.

Accordingly, it is the object of the invention to provide a simple, inexpensive device for denying access to the inner works of an appliance or utility meter by unauthorized personnel. If unauthorized personnel do gain access to the inner works, evidence of their tampering is plain.

These and other objects and features of the invention will be apparent from the following description of the preferred embodiment and from the drawing.

DESCRIPTION OF THE PREFERRED EMBODIMENT

The present invention provides a simple, economical tamper-proof fastening device for sealing collars such as those used with household watt-hour utility meters. In particular, the device provides a way to prevent turning of a bolt that clamps together the ends of a sealing collar which holds a cover to a meter base.

Figure 1:
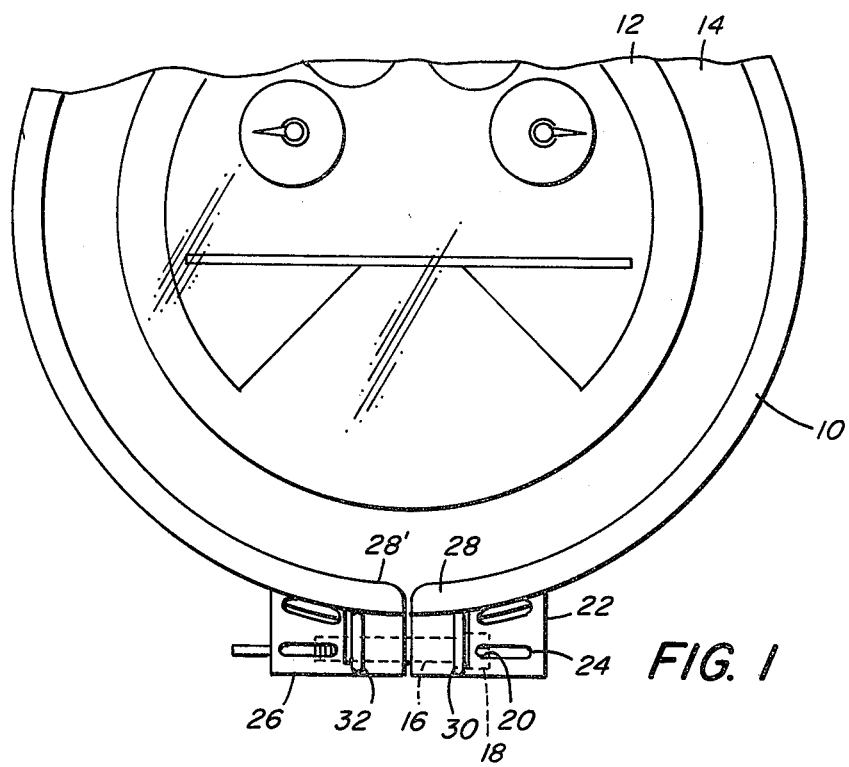
FIG. 1 is a side view of a utility meter showing the tamper-proof fastening device, the sealing collar and the meter.

Referring to the drawing, FIG. 1 illustrates a side view of a utility meter and the tamper-proof device. The utility meter 12 has a glass cover 14 clamped to it by a sealing collar 10. The sealing collar 10 consists of a fairly resilient metal annulus having a U-shaped configuration on its inner surface which clamps together a metal flange on the base of the utility meter 12 and a flange on the glass cover 14. The two ends 28, 28' of the sealing collar 10 are joined by a threaded bolt 16 having a head 18 containing a transverse slot 20. A first bracket 22, which is disposed proximate to the head 18, has a transverse slot 24 through its wall aligned with the slot 22 in the head 18. The bolt 16 passes through a hole in the first brace 30 which is supported by a first bracket 22 and is threaded into a hole in second brace 32 which is supported by the second brace 26. The sealing collar 10 is tightened or loosened by turning the bolt 16.

Figure 2:
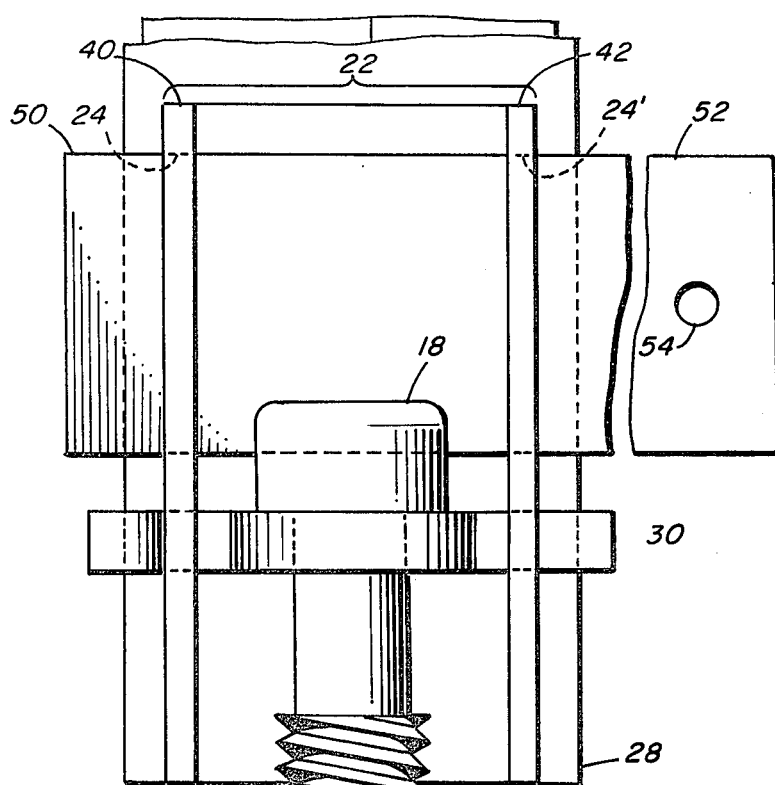
FIG. 2 is a top view of the tamper-proof device.

FIG. 2 illustrates a top view of the tamper-proof device. The first bracket 22, comprising walls 40 and 42, is disposed proximate to the head 18 and a second bracket 26, comprising walls 44 and 46, is disposed adjacent to the shank of the first bolt 16. The first bolt 16 is parallel to the walls 40, 42, 44 and 46 and passes through braces 30 and 32. A hard metal tab 48 intersects transverse slots 24 and 24' in the side walls 40 and 42, respectively, and engages the transverse slot 20 in the head 18. One end 50 of the tab 48 is bent at a substantial angle to prevent transit of the tab 48 through the slot 24 and a tamper-resistant second bolt passes through a hole 54 near the other end 52 of the tab 48 thereby preventing transit of the tab 48 through the slot 24'.

Figure 3:
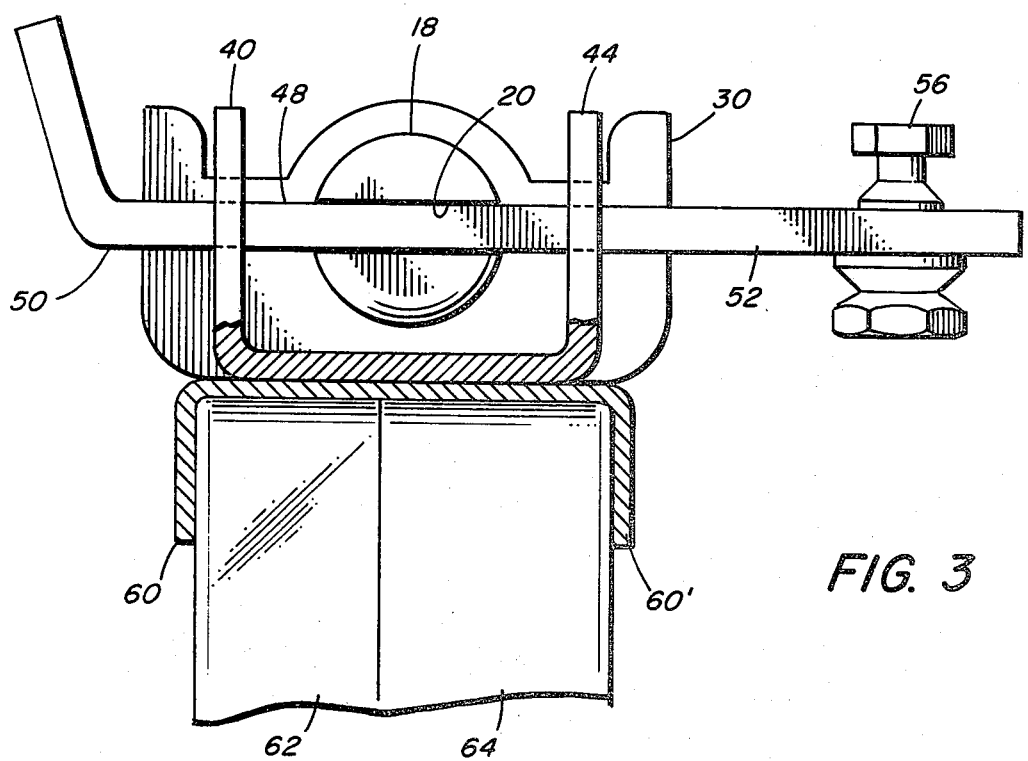
FIG. 3 is a longitudinal view of the tamper-proof device from the side of the device closest to the tab, showing a cut-away view of the sealing collar.

FIG. 3 illustrates a side view of the tamper-proof device showing a cut-away view of the sealing collar 10, meter 12 and cover 14. The bend near the end 50 in tab 48 is evident. A tamper-resistant second bolt 56 is shown passing through the hole 54. The U-shaped configuration on the interior surface of the sealing collar 10, comprising walls 60 and 60', clamps the flange 62 of the cover 14 to the flange 64 of the meter 12.

Figure 4:
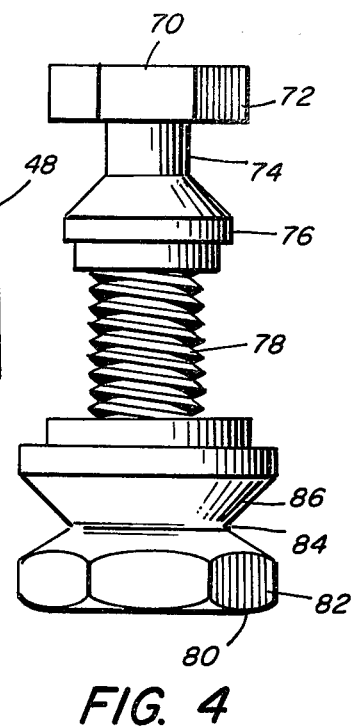
FIG. 4 is a side view of a shear bolt and shear nut.
Figure 5:
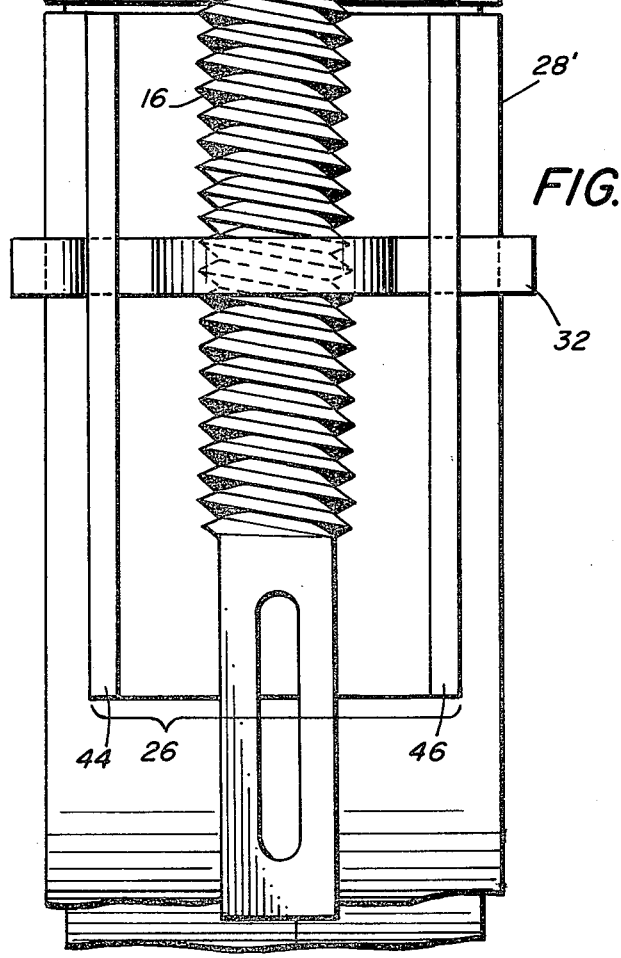
FIG. 5 is a side view of a one-way screw and a shear nut.

FIGS. 4 and 5 illustrate two alternate embodiments of tamper-resistant second bolt 56. In FIG. 4, second bolt 56 comprises a shear bolt head 70 and a shear nut 80. The shear bolt 70 comprises a gripping section 72 separated from a conical engaging section 76 and a threaded shank 78 by a frangible neck 74. The shear nut 80 comprises a gripping section 82 separated from a conical engaging section 86 by a frangible neck 84. When designated torques are applied to gripping sections 72 or 82, the frangible necks 74 and 84 fracture leaving engaging sections 76 and 86 surrounding hole 54. The engaging sections 76 and 86 are smooth, substantially conical sections which cannot be removed without special tools. The engaging sections 76 and 86 are sufficiently large so as to prevent transit of the tab 48 through the slot 24'.

In FIG. 5, a one-way screw 90 is threaded through hole 54 into a shear nut 80. The one-way screw 90 comprises a head 92 bevelled on alternate quadrants of its top surface and a threaded shank 94. Because of the bevelling of the head 92, the one-way screw 90 can be tightened but not loosened without the use of special equipment. The shear nut 80 is identical to the shear nut 80 of FIG. 4 and its frangible neck 84 fractures under a designated torque leaving the conical engaging section 86 in place about the hole 54. The head 92 of the one-way screw 90 and the engaging section 86 of the shear nut 80 are sufficiently large to prevent the transit of the clip 48 through hole 24'.

In operation, U-shaped walls 60 and 60' on the interior surface of sealing collar 10 clamp the flange 62 of the cover 14 to the flange 64 of the meter 12. The sealing collar 10 is closed and tightened by turning the first bolt 16 which passes through the first brace 30 and is threaded through the second brace 32. To lock the sealing collar 10 in place, the tab 48 intersects slots 24 and 24' and engages the slot 20 in the head 18. Removal of the tab 48 is prevented by a bend in the tab 48 near the end 50 and the tamper-resistant second bolt 56 through the hole 54 near the end 52. Once the second bolt 56 is tightened, it cannot be removed without special tools or evidence of tampering.

This device will prohibit tampering with utility meters by unauthorized personnel but still permits the use of conventional sealing collars. All that is required is training utility company personnel how to use the special tools to remove the tamper-resistant second bolt 56.

The invention may be embodied in other specific forms without departing from the spirit and scope thereof. Accordingly, other embodiments are within the following claims.

What is claimed is:

1. A tamper-proof device for protecting and fastening a sealing collar comprising a first bolt disposed proximate to a first wall provided with a transverse slot, the head of said first bolt being provided with a transverse slot aligned with the slot in said first wall; a hard metal tab adapted to transverse the slots in said first wall and the head of said first bolt, said tab having one end bent at a substantial angle and a hole adjacent to the other end; a second bolt passing through said hole; and means for preventing removal of said second bolt; whereby said tab prevents said first bolt from turning and said bent end and second bolt prevent removal of said tab.

2. The tamper-proof device according to claim 1 further comprising a second wall disposed substantially parallel to said first wall, said second wall provided with a transverse slot aligned with the slots in said first wall and the head of said first bolt so that said tab may also traverse the slot in said second wall, said hole being located adjacent to the end of said tab which is adapted to traverse said second wall, whereby said second bolt prevents the transit of said tab through the slot in said second wall.

3. The tamper-proof device according to claims 1 or 2 wherein said second bolt comprises a one-way screw threaded in said hole.

4. The tamper-proof device according to claim 1 wherein said second bolt comprises a bolt with a threaded shank having two ends, said bolt having a shear head integrally formed on one end of said threaded shank and a shear nut through which the other end of said shank is threaded.

5. The tamper-proof device of claim 4 wherein said shear head comprises a gripping section separated from an engaging section by a frangible neck, said engaging section being adjacent said threaded shank, whereby when a designated torque is applied to said gripping section said frangible neck fractures separating said gripping section from said engaging section.

6. The tamper-proof device of claim 4 wherein said shear nut comprises a gripping section separated from an engaging section by a frangible neck, whereby when a designated torque is applied to said gripping section, said frangible neck fractures thereby separating said gripping section and said engaging section.

7. The tamper-proof device according to claim 2 wherein said second bolt comprises a bolt with a threaded shank having two ends, said bolt having a shear head integrally formed on one end of said threaded shank and a shear nut through which the other end of said shank is threaded.

8. The tamper-proof device of claim 7 wherein said shear head comprises a gripping section separated from an engaging section by a frangible neck, said engaging section being adjacent said threaded shank, whereby when a designated torque is applied to said gripping section said frangible neck fractures separating said gripping section from said engaging section.

9. The tamper-proof device of claim 7 wherein said shear nut comprises a gripping section separated from an engaging section by a frangible neck, whereby when a designated torque is applied to said gripping section, said frangible neck fractures thereby separating said gripping section and said engaging section.

* * * * *